United States Patent [19]

Wong

[11] Patent Number: 4,637,581
[45] Date of Patent: Jan. 20, 1987

[54] FOUR POINT SUPPORT FOR COPIERS AND THE LIKE

[75] Inventor: Lam F. Wong, Walworth, N.Y.

[73] Assignee: Xerox Corporation, Stamford, Conn.

[21] Appl. No.: 777,482

[22] Filed: Sep. 19, 1985

[51] Int. Cl.$^4$ ............................................. F16M 11/24
[52] U.S. Cl. .................................. 248/188.3; 248/182
[58] Field of Search ............... 248/188.3, 188.2, 188.4, 248/188.5, 182, 148, 649; 180/141; 280/6 R; 312/255

[56] References Cited

U.S. PATENT DOCUMENTS 2,942,829  6/1960  Stiffel ............................. 248/188.3
4,257,618  3/1981  Tax et al. ........................ 248/188.3
4,270,718  6/1981  Conner ........................... 248/188.3

Primary Examiner—Ramon O. Ramirez
Attorney, Agent, or Firm—Frederick E. McMullen

[57] ABSTRACT

A four point self-leveling support for a copier having a vertically slidable spring biased leg at each corner for contacting the floor, a cable and pulley connection from each leg to a common point located within the confines of a tetrahedron, a pulley at the apex of the tetrahedron, the cable to the leg at one corner being strung around the elevated pulley, whereby depositing of the support with copier on an uneven floor surface causes the legs to project by an amount necessary to contact the floor against the tension from the other legs transmitted via the cables so that the copier is level, and locking bolts to fix the legs in adjusted position following leveling.

5 Claims, 3 Drawing Figures

FOUR POINT SUPPORT FOR COPIERS AND THE LIKE

The invention relates to a support for a copier, and more particularly, to a self-leveling support for a copier.

A historical problem with machine supports such as typically used to support floor and desk top machines such as copiers, is that floor unevenness requires that one, two, or all of the support legs, which may for example comprise casters, be spring loaded in order to prevent rocking of the machine caused by one support leg not contacting the floor. While many four-legged supports used with appliances such as refrigerators have adjustable supports in the form of screw legs built in to enable any unevenness in the supporting surface to be compensated for by turning the screw, the fine adjustment often required is sometimes difficult to make due to nearby structural items such as walls, adjacent equipment, etc.

For point suspensions are found in the prior art as demonstrated by U.S. Pat. No. 4,270,718 to Conner, Jr. However, supports of the Conner, Jr. type require that the opposing support legs move in tandem, that is, as one leg is raised to accommodate unevenness in the supporting surface, the diagonally opposed leg is similarly raised while the remaining two legs are lowered. As a result, the support frame is tilted to achieve the desired support.

The present invention seeks to provide a four-legged, self-leveling support for a load such as a copier which comprises, in combination: first, second, third, and fourth support means for the load, the support means being located at the corners of a quadrilateral with the support means being adapted to bear on a supporting surface to support the load; each support means having an individual connection with the load for transmission of force from the load to the supporting surface, with relative up and down movement of each support means at the respective corner, first means interconnecting the first support means to a common point for transmitting force from the first support means to the common point on movement of the first support means in one direction and for transmitting force from the common point ot the first support means on movement of the common point in the opposite direction; second means interconnecting the second support means to the same common point for transmitting force from the second support means to the common point on movement of the second support means in one direction and for transmitting force from the common point to the second support means on movement of the common point in the opposite direction; third means interconnecting the third support means to the same common point for transmitting force from the third support means to the common point on movement of the third support means in one direction and for transmitting force from the common point to the third support means on movement of the common point in the opposite direction; and fourth means interconnecting the fourth support means to the common point for transmitting force from the fourth support means to the common point on movement of the fourth support means in one direction and for transmitting force from the common point to the fourth support means on movement of the common point in the opposite direction; the common point laying within a tetrahedron with the fourth means passing through the apex of the tetrahedron.

IN THE DRAWINGS

Figure 1:
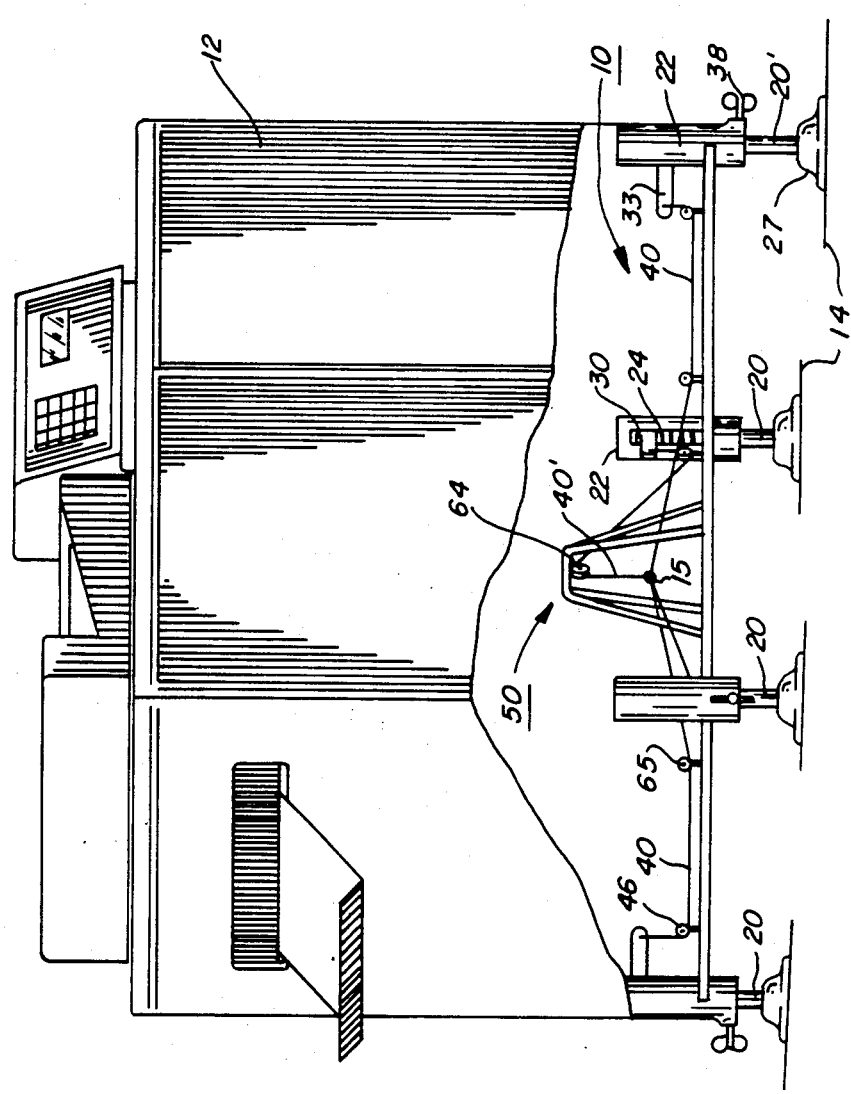
FIG. 1 is a corner view in partial section showing the support of the present invention supporting a load in the form of a copier in a level condition on the surface of a downwardly sloping floor.
Figure 2:
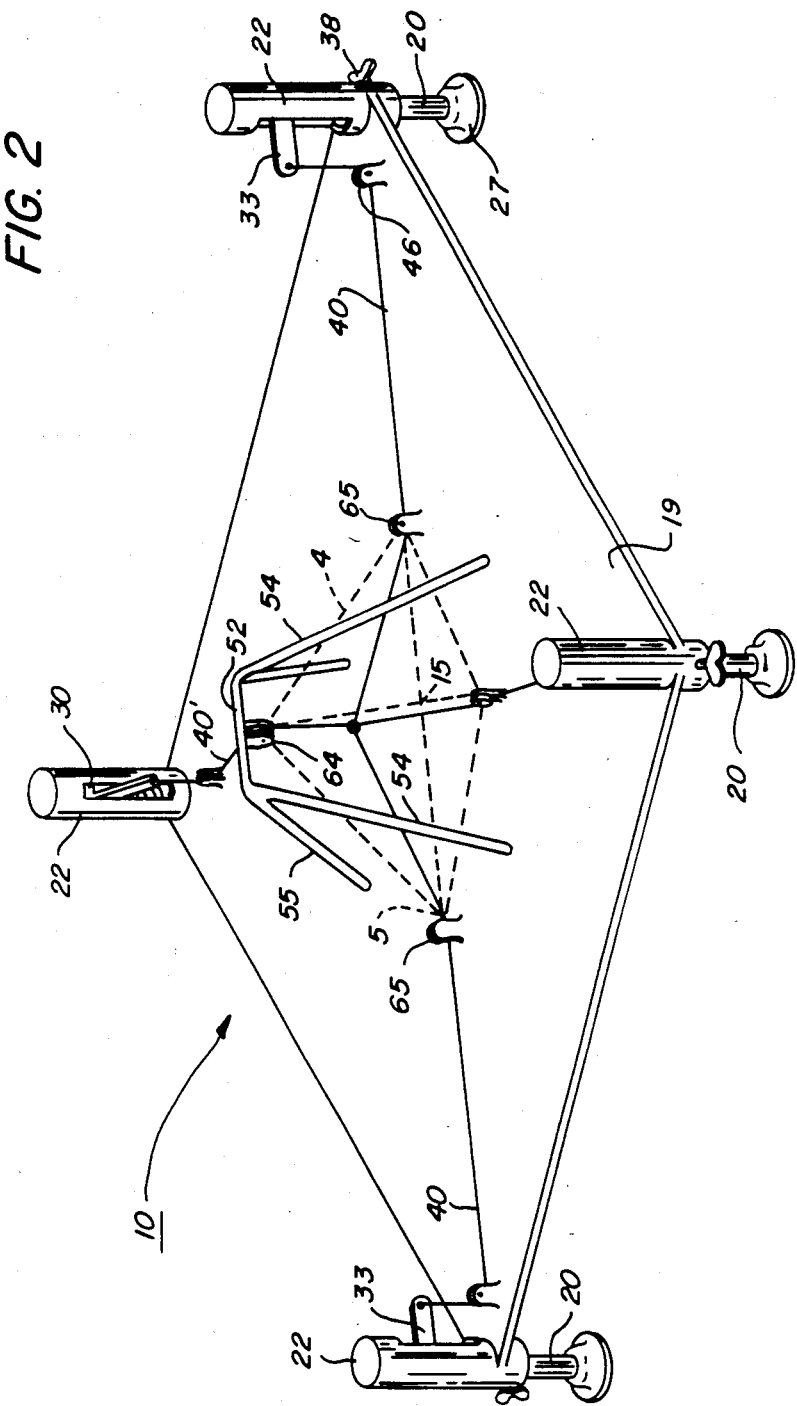
FIG. 2 is an isometric view showing details of the support in FIG. 1 with the tetrahedron within which the support lies being superimposed thereon in dotted lines.
Figure 3:
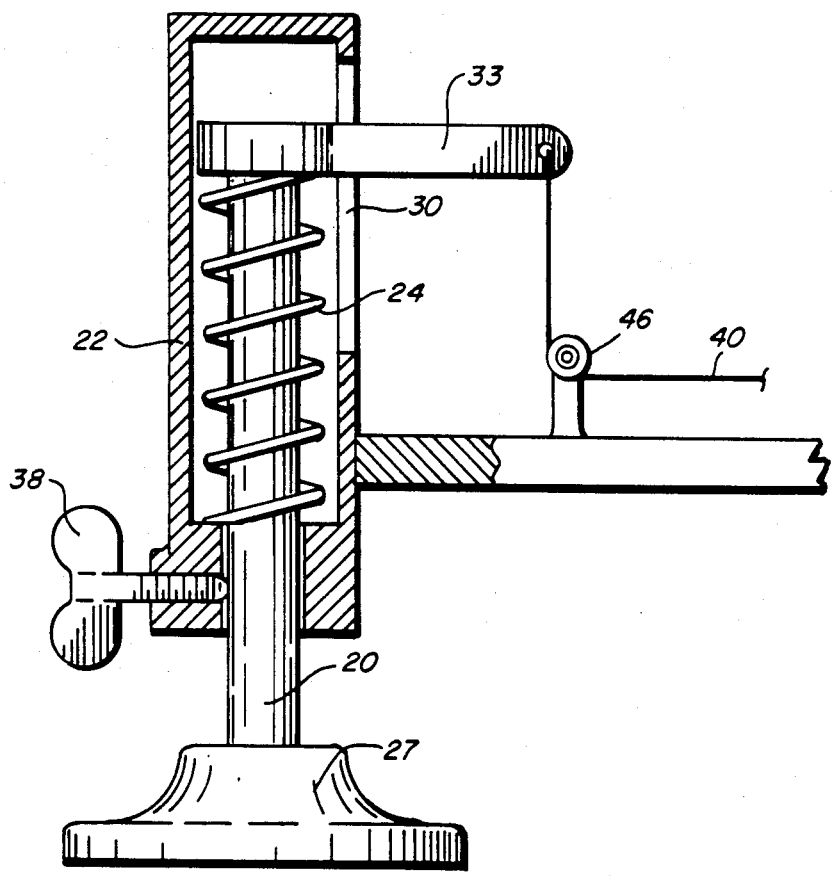
FIG. 3 is an enlarged view in section illustrating details of the supporting legs at each corner of the support shown in FIG. 1.

Referring to FIGS. 1-3 of the drawings, there is shown the four point support of the present invention, which is designated generally by the numeral 10, for supporting a load such as copier 12 level in spite of unevenness in the supporting surface such as a floor 14. As will appear more fully, support 10 with copier 12 is initially set in the unlocked mode on floor 14 during which support 10 will establish a level platform in accommodation of any unevenness in floor 14. Following this, support 10 is locked to retain support 10 in the adjusted setting.

The fundamental principle upon which support 10 is based rests in the spatial geometry of a tetrahedron (shown by dotted lines 4 in FIG. 2). As will be understood, any point contained inside tetrahedron 4, referred to herein as the common point 15 as will appear more fully, represents a unique set of four distances between that point and the four vertices 5 of the tetrahedron. Common point 15 is always contained inside tetrahedron 4. A change in the distance between point 15 and one of the vertices 5 will cause the same amount of compensating displacement in each of the remaining distances between common point 15 and the other vertices. Theoretically, there are an infinite number of points contained within a tetrahedron which provide an infinite set of displacement relationships, each set accommodating a unique case of supporting surface unevenness which can be compensated for. The severity of unevenness of floor 14 which can be accommodated by support 10 is directly proportional to the physical size of the tetrahedron 4 formed. The physical placement of the tetrahedron in the support 10 is completely arbitrary.

Support 10 has a generally rectangular frame 19 with a vertical piston-like leg or stud 20 at each corner of frame 19. Leg 20 is slidably received in a cylinder 22 which may be integral with frame 19 at each corner. A soft spring 24 trapped between the closed end wall of cylinder 22 and leg 20 biases leg 20 downwardly. Conveniently, the lower or floor engaging end of leg 20 may be widened at 27 to provide more surface area.

A slotted opening 30 is provided in the inboard side of each cylinder 22. A drive finger 33 fixed to the upper end of leg 20 projects through opening 30, opening 30 permitting vertical up and down movement of drive finger 33 as leg 20 moves up and down in cylinder 22. A locking bolt 38 is threaded through cylinder 22 for engagement with leg 20 to lock leg 20 against movement once leveling has been achieved.

Each drive finger 30 has one end of an operating cable 40 attached thereto. To guide and facilitate longitudinal movement of cables 40, support pulleys 46, are provided on frame 19 below the path of movement of drive fingers 33 such that the portion of cables 40, extending between drive fingers 33 and pulleys 46, is substantially perpendicular to the plane of frame 19. Cables 40 are joined together at common point 15.

A super-structure 50 in the form of a cross bar 52 supported by pairs of outwardly depending legs 54, 55 mounted on base 19 above the geometric centroid of tetrahedron 4 is provided. A pulley 64 is hung from bar 52 and one cable 40' threaded therethrough. Guide pulleys 65 mounted on frame 19 are provided to guide and support the remaining cables 40.

Operation

In operation, support 10 together with copier 12 is set on floor 14 with the enlarged base 27 of legs 20 resting on the surface of the floor. Locking bolts 38 are in the retracted position so that legs 20 are free to move in cylinders 22. In the unloaded state (i.e. when support 10 with copier 12 is in a suspended condition above floor 14), each leg 20, under the influence of springs 24, projects downwardly by substantially the same amount, it being understood that the overall distance by which legs 20 project from cylinders 22 is dependent on the design parameters of the particular support.

As support 10 with copier 12 thereon touches floor 14 and the weight of the support and copier are taken up by floor 14, legs 20 are forced upwardly against the bias of soft springs 24 into their respective cylinders. As the weight of support 10 and copier 12 are absorbed by the cable tensions, each leg 20 is retracted by an amount corresponding to the contour of the floor 14 where the leg touches. Where for example, the area of floor 14 under on leg (referred to as leg 20' herein for purposes of discussion), is lower that the areas of floor 14 under the other legs, the affected leg 20' is not retracted by as great an amount as are the other legs resting on the more elevated areas of floor 14. As a result, the tension force on the cable 40 to leg 20' is greater than the tension force on the cables to the remaining legs 20. The difference in tension force causes the cable 40 to leg 20' to pull or displace the common point 15 in the direction of leg 20', such pulling movement being permitted by the reduced tension force on the remaining cables until an equilibrium point is reached where the tension forces on cables 40 stabilize and offset one another. As a result, the legs 20 at the four corners of support 10 extend by an amount equal to the depth of the floor 14 contacted by each leg while the support frame 19 and the load carried by support 10, i.e. copier 12, remains level.

Once the aforesdescribed equilibrium condition is achieved, locking bolts 38 are set at each leg 20 to lock the legs 20 in the adjusted position and against further movement.

While support 10 has been described and illustrated as supporting a copier, other types of loads may be readily envisioned. And, while support 10 is illustrated as having the load integral therewith, the load such as copier 12 may be removable from support 10.

While the invention has been described with reference to the structure disclosed, it is not confined to the details set forth, but is intended to cover such modifications or changes as may come within the scope of the following claims.

I claim:

1. A four-point support for easy leveling a load comprising:

first, second, third and fourth support means for the load, said support means being located at the corners of a quadrilateral, said support means being adapted to bear on a supporting surface at four points for supporting the load above said surface;

each support means having an individual connection with the load for transmission of force from the load to said supporting surface, each support means being movable, the first and third support means being located at two opposite corners of the quadrilateral and the second and fourth support means being located at the other two opposite corners of the quadrilateral, first means interconnecting said first support means to a common point for transmitting force from said first support means to said common point on movement of said first support means in one direction and for transmitting force from said common point to said first support means on movement of said common point in the opposite direction;

second means interconnecting said second support means to said common point for transmitting force from said second support means to said common point on movement of said second support means in one direction and for transmitting force from said common point to said second support means on movement of said common point in the opposite direction;

third means interconnecting said third support means to said common point for transmitting force from said third support means to said common point on movement of said third support means in one direction and for transmitting force from said common point to said third support means on movement of said common point in the opposite direction; and fourth means interconnecting said fourth support means to said common point for transmitting force from said fourth support means to said common point on movement of said fourth support means in one direction and for transmitting force from said common point to said fourth support means on movement of said common point in the opposite direction;

said common point laying within a tetrahedron;

said fourth means passing through the apex of said tetrahedron.

2. The support according to claim 1 in which:

said first means includes a first flexible cable connected between said first support means and said common point, and a first pulley for supporting and guiding said first cable for movement;

said second means including a second flexible cable connected between said second support means and said common point, and a second pulley for supporting and guiding said second cable for movement;

said third means including a third flexible cable connected between said third support means and said common point, and a third pulley for supporting and guiding said third cable for movement;

said fourth means includes a fourth flexible cable connected between said fourth support means and said common point, and a fourth pulley for supporting and guiding said fourth cable for movement;

said first, second, third, and fourth pulleys cooperating to form said tetrahedron.

3. The support according to claim 2 including:

superstructure means forming an elevated suspension point above the level of said common point;

said fourth pulley supporting said fourth cable at said elevated suspension point at the apex of said tetrahedron.

4. The support according to claim 3 in which each of said first, second, third and fourth support means includes a generally vertical cylinder, a piston-like leg in said cylinder supported for reciprocating up and down movement with a free end projecting from said cylinder to engage said supporting surface, and bias means for biasing said leg downwardly toward said supporting surface.

5. The support according to claim 4 including:
lock means for each of said legs for locking said legs in adjusted position against up and down movement following leveling of said load.

* * * * *